United States Patent [19]

Washida et al.

[11] 4,182,551
[45] Jan. 8, 1980

[54] ELECTROCHROMIC DISPLAY DEVICE

[75] Inventors: Hiroshi Washida, Kawasaki; Hiroshi Morita, Machida, both of Japan

[73] Assignee: Tokyo Shibaura Electric Co., Ltd., Tokyo, Japan

[21] Appl. No.: 860,856

[22] Filed: Dec. 15, 1977

[30] Foreign Application Priority Data

Dec. 20, 1976 [JP] Japan .................... 51-151950
Mar. 31, 1977 [JP] Japan .................... 52-35463

[51] Int. Cl.² ................................ G02F 1/17
[52] U.S. Cl. ................................ 350/357
[58] Field of Search .................... 350/357

[56] References Cited

U.S. PATENT DOCUMENTS

| 3,807,832 | 4/1974 | Castellion | 350/357 |
|---|---|---|---|
| 3,975,086 | 8/1976 | Leibowitz | 350/357 |
| 3,978,007 | 8/1976 | Giglia et al. | 350/357 |
| 4,039,253 | 8/1977 | Jain | 350/357 |

Primary Examiner—James W. Davie
Attorney, Agent, or Firm—Cushman, Darby & Cushman

[57] ABSTRACT

An electrochromic display having enlarged surface area of the electrochromic material for rapid coloration and rapid bleaching yet fabricated so as to prevent corrosion of the electrode by the electrolyte. In a first embodiment, the display includes a conductive electrode formed on a substrate; a protective layer formed on the conductive electrode; a porous layer of an electrochromic material formed on the protective layer; a counter electrode formed apart from the porous layer; and an electrolyte disposed between the porous layer and the counter electrode. The protective layer is fabricated from a dense layer of an electrochromic material and the conductive electrode is fabricated from a metal non-reactive with the electrolyte. The porous layer is in direct contact with the conductive electrode. In a second embodiment, the electrode is made from a conductive material that is non-reactive with the electrolyte.

19 Claims, 7 Drawing Figures

Anodic Oxidation Film of Tungsten (×10000)

ELECTROCHROMIC DISPLAY DEVICE

BACKGROUND OF THE INVENTION

This invention relates to an improvement of a display device utilizing electrochromic phenomenon.

Certain substances are colored if electric current flows therethrough and the coloring of this fashion is called the "electrochromic phenomenon." On the other hand, the substance exhibiting the electrochromic phenomenon is called the "electrochromic material." This coloring is bleached by the flow of current in the reverse direction. In general, the electrochromic phenomenon is thought to accompany the formation of color centers or the oxidation-reduction reaction.

British Pat. No. 1,186,541 and U.S. Pat. No. 3,807,832 disclose many electrochromic materials. Tungsten oxide and molybdenum oxide are typical examples of inorganic electrochromic materials. Organic electrochromic materials such as viologen bromide are also under development.

Described in the following is an example of the conventional electrochromic display device, with reference to the appended FIG. 1. In the drawing, reference numeral 1 denotes a tungsten oxide film providing an electrochromic material. It is seen that the electrochromic material film 1 is formed on a transparent or translucent conductive film 2 acting as a conductive electrode. Further, the conductive film 2 is formed on a transparent substrate 3. Reference numeral 4 represents a counter electrode formed about 1 mm apart from the substrate 3. As shown in the drawing, an electrolyte 5 is sealed by a sealing material 6 between the film 1 and the counter electrode 4. The electrochromic material film 1 is colored blue when voltage is applied across the conductive film 2 and the counter electrode 4 such that the former acts as the negative electrode and the latter as the positive electrode. The coloring is observed, for example, in the direction shown by an arrow 7. As described previously, the coloring is bleached if the reverse voltage is applied across the film 2 and the counter electrode 4.

Capability of a rapid response is one of the properties required for the electrochromic display device. Namely, the device should be capable of a rapid coloration and a rapid bleach. The idea of enlarging the surface area of the electrochromic material film has already been proposed as a means for achieving a rapid response. For example. Japanese patent disclosure (Kokai) No. 51-23100 (disclosed on Feb. 24, 1976) discloses an electrochromic display device having a tungsten oxide layer with many holes and capable of a rapid coloration and rapid bleach. In this case the electrochromic material layer is formed by means of vapor deposition on a conductive film with a mesh interposed therebetween, thereby obtaining the electrochromic material layer with many holes.

FIG. 2 shows a modification of FIG. 1. Namely, a electrochromic material layer 21 of tungsten oxide with many holes is substituted in FIG. 2 for the tungsten oxide film 1 shown in FIG. 1. Incidentally, the reference numerals of FIG. 2, which are the same as those of FIG. 1, denote the same members. FIG. 2 clearly shows that the electrolyte 5 is in contact with the tungsten oxide layer 21 and also contacts with the conductive film 2 through the holes of the electrochromic material layer 21. It is important to note that tin oxide, which is readily corroded by the electrolyte such as sulfuric acid, is used as a typical material of the conductive film 2. To be more specific, tin oxide is gradually reduced into tin and water by the hydrogen ion attracted to the conductive film during the voltage application. It follows that the conductivity of the conductive film is lowered, leading to the impaired performance of the display device.

SUMMARY OF THE INVENTION

An object of this invention is to provide an electrochromic display device having a long life without the corrosion problem of the conductive electrode caused by the contact of the electrolyte with the conductive electrode.

Another object is to provide an electrochromic display device having a high bonding strength between the conductive electrode and the electrochromic material layer.

Still another object is to provide an electrochromic display device capable of a rapid response.

According to this invention, there is provided an electrochromic display device, comprising a conductive electrode formed on a substrate, a protective layer formed on the conductive electrode, a porous layer of an electrochromic material formed on the protective layer, a counter electrode provided apart from the porous layer, and an electrolyte disposed between the porous layer and the counter electrode. The protective layer is preferably formed of a dense layer of an electrochromic material. It is also preferred to form the porous layer by forming on the protective layer a film of a metal providing an electrochromic metal oxide, followed by anodic oxidation of the metal film. The porous layer may also be formed by means of vapor deposition of an electrochromic metal oxide under a vacuum of $10^{-3}$ Torr to 10 Torr. Naturally, the vaporized metal oxide is deposited on the protective layer.

According to another feature of this invention, there is provided an electrochromic display device, comprising a conductive electrode formed of a metal stable against the electrolyte, a porous layer of an electrochromic material formed on the conductive electrode, a counter electrode formed apart from the porous layer, and an electrolyte disposed between the porous layer and the counter electrode. The conductive electrode formed of a metal stable against the electrolyte may be in the form of a plate or in the form of a film formed on a substrate. The metals suitable for forming the conductive electrode include gold, platinum, silver and tantalum. Where the conductive electrode is formed of any of these metals, it is preferred to form the porous layer by forming first on the conductive electrode a film of a metal providing a metal oxide of electrochromic material, followed by anodic oxidation of the metal film. In this case, the thickness of the porous layer can be controlled very easily because these metals are not easily oxidized by anodic oxidation.

Namely, these metals operate as stopper for anodization.

The conductive electrode stable against the electrolyte may also be formed of a metal providing an electrochromic metal oxide. In this case, the porous layer should preferably be formed by subjecting the surface region of the conductive electrode to anodic oxidation. This method is advantageous in that the bonding strength between the conductive electrode and the porous layer is extremely high, because the metal forming the conductive electrode is the same as the metal providing the metal oxide of the porous layer.

The electrochromic materials suitable for this invention are metal oxides such as tungsten oxide, molybdenum oxide, titanium oxide and lead oxide.

DETAILED DESCRIPTION OF THE PREFERRED EMBODIMENTS

Figure 1:
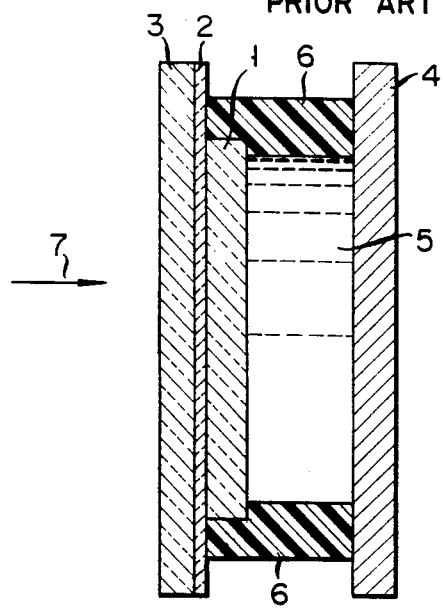
FIGS. 1 and 2 are cross sectional views of conventional electrochromic display devices.
Figure 2:
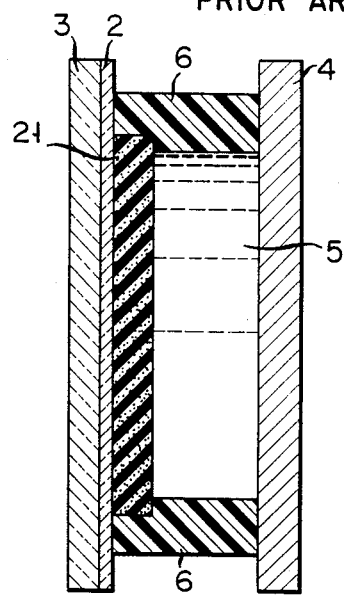
Figure 3:
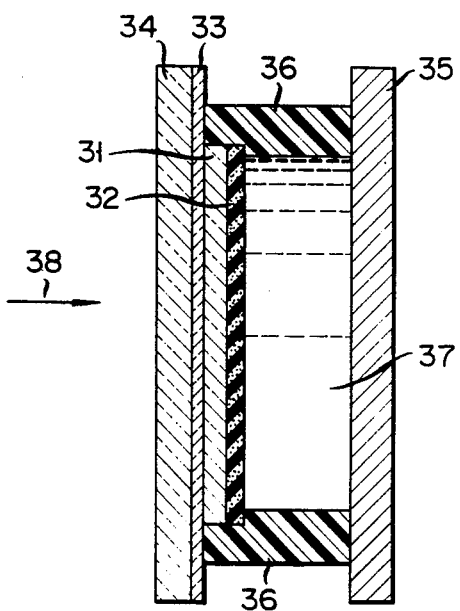
FIGS. 3 and 4 are cross sectional views of electrochromic display devices according to embodiments of this invention.

FIG. 3 shows an electrochromic display device according to one embodiment of this invention, in which a protective layer intervenes between a conductive electrode and a porous electrochromic material layer. In the drawing, reference numeral 31 denotes a dense layer of an electrochromic material acting as a protective layer. It is seen that a porous layer 32 of the electrochromic material is formed on the dense layer 31. Further, the dense layer 31 is formed on a transparent or translucent conductive film 33 made of tin oxide. The conductive film 33, acting as a conductive electrode, is formed on a transparent glass substrate 34.

Reference numeral 35 denotes a counter electrode formed at a predetermined distance from the porous layer 32. The counter electrode 35 may be formed of a conductive film of stable metal such as gold, silver, platinum, titanium, tantalum or stainless steel. Alternatively, the counter electrode may be of two layer construction consisting of a conductive film and a dense layer of an electrochromic material laminated on the conductive film, or of three layer construction further comprising a porous layer of the electrochromic material laminated on the dense layer.

Reference numeral 36 represents a sealing material. As shown in the drawing, an electrolyte 37 is sealed in the region defined by the sealing material 36, the counter electrode 35 and the porous layer 32. An electrolytic solution such as sulfuric acid is used as a preferred electrolyte. In addition, phosphoric acid, acetic acid, oxalic acid, lithium chlorate, etc. are suitable for use as the electrolyte. Further, a gell-like electrolyte containing glycerin, fine powder of $TiO_2$, etc. may also be used in this invention.

It is preferred that the relative density of the porous layer 32 of the electrochromic material be about 50 to 95% of the bulk density thereof.

The dense layer 31 may be formed on the tin oxide film 33 by means of vacuum evaporative deposition of electrochromic material under a vacuum of, for example, $10^{-5}$ Torr or a higher vacuum. Another method such as sputtering method or chemical vapor deposition (CVD) method may also be employed for forming the dense layer 31. Incidentally, a heat treatment step may follow the step of forming the dense layer, as required.

The porous layer 32 may be formed by forming a tungsten film on the dense layer 31 by means of vacuum evaporative deposition or sputtering, followed by subjecting the tungsten film to anodic oxidation. Alternatively, tungsten oxide may be deposited on the dense layer 31 by means of vapor deposition under a vacuum of $10^{-3}$ to 10 Torr.

Preferably, the thickness of the dense layer 31 ranges from about $0.03\mu$ to about $1\mu$, more preferably, from about $0.05\mu$ to about $0.3\mu$. On the other hand, the porous layer 32 should preferably be about 0.1 to $2\mu$ thick, more preferably about 0.2 to $1\mu$ thick.

If voltage is applied to the electrochromic display device of the above-described construction such that the conductive film 33 acts as the negative electrode and the counter electrode 35 as the positive electrode, the electrochromic material is colored blue as observed in the direction shown by an arrow 38. The coloring is bleached if the reverse voltage is applied to the device.

It is important to note that the electrolyte 37 penetrates into the porous layer 32, but is prevented from direct contact with the tin oxide film 33 acting as the conductive electrode because the dense layer 31 of tungsten oxide is formed between the porous layer 32 and the tin oxide film 33. It follows that the dense layer 31 acts as a protective layer serving to protect the tin oxide film 33 from the attack of the electrolyte 37.

Thus, the display device of this invention is markedly stable chemically, and has a long life time compared with the device in which a porous electrochromic layer is formed in direct contact with a conductive electrode. Further, the dense layer 31 and the porous layer 32 are formed of the same electrochromic material, leading to a high bonding strength between the two.

Figure 4:
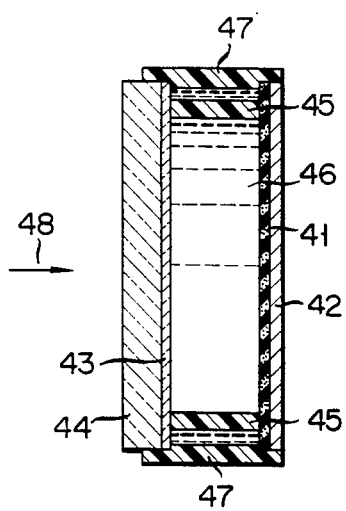

It is also important to note that the display device of this particular construction exhibits an improved response speed because the electrolyte 37 is brought into contact with the porous layer 32 having a prominently large surface area.

Where the conductive electrode is formed of a metal providing a metal oxide acting as an electrochromic material, this invention permits forming the porous layer of an electrochromic material in direct contact with the conductive electrode. FIG. 4 is intended to provide an example of electrochromic display device of this particular construction. As shown in the drawing, a porous electrochromic layer 41 made of tungsten oxide is formed on a tungsten plate 42 acting as a conductive electrode. Further, a transparent conductive film 43 acting as a counter electrode is formed on a transparent substrate 44. It is seen that the porous tungsten oxide layer 41 faces the counter electrode 43 with a spacer 45 interposed therebetween so as to separate the two about 1 mm apart from each other. Sulfuric acid acting as an electrolyte 46 is housed in the clearance mentioned and sealed by a sealing material 47.

Figure 5:
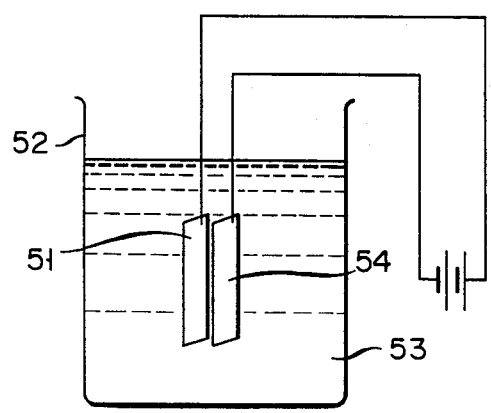
FIG. 5 schematically shows how to form a porous layer of an electrochromic material suitable for this invention.

FIG. 5 shows how to form the porous tungsten oxide layer 41 on the tungsten plate 42. In the first step, a tungsten plate 51 having a thickness of $50\mu$ is prepared and the surfaces thereof are washed clean. On the other hand, a 5% aqueous solution 53 of oxalic acid is housed in a vessel 52. Then, the tungsten plate 51 and a counter electrode 54 are immersed in the solution 53 in a manner to face each other. As shown in the drawing, the tungsten plate 51 and the counter electrode 54 are connected to the positive electrode and the negative electrode of a power source, respectively. The anodic oxidation is carried out at a constant current density of about 0.05

Figure 6:
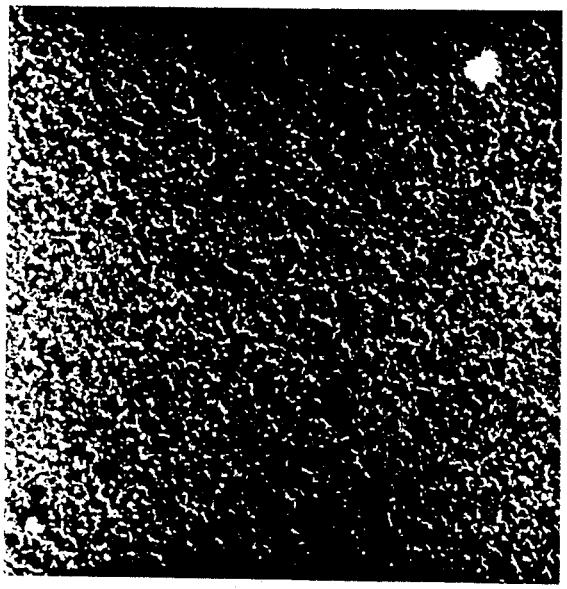
FIG. 6 is a scanning type electron microphotography, showing the surface of the porous layer of an electrochromic material suitable for this invention.

A/cm². A tungsten oxide layer having a thickness of about 1μ is formed on the surface of the tungsten plate 51 after 60 minutes of operation at a current density of 0.05 A/cm². FIG. 6 is a microphotography of a surface of the tungsten oxide layer thus formed on the tungsten plate. It is clearly seen that the tungsten oxide layer is porous. In general, the relative density of the porous layer is about 50 to 95% of the bulk density thereof.

If voltage is applied to the display device shown in FIG. 4 by connecting the tungsten plate 42 acting as the conductive electrode and the transparent counter electrode 43 to the negative and positive electrodes of a power source, respectively, the porous tungsten oxide layer 41 providing the electrochromic material is colored blue as observed in the direction shown by an arrow 48. If voltage is applied in the opposite direction, the porous electrochromic layer 41 is brought back to its original transparent state, resulting in that the display device exhibits the metallic color of the tungsten plate 42 disposed beneath the porous electrochromic layer 41.

As is the case with the device of FIG. 3, the contact area between the porous tungsten oxide layer 41 and the electrolyte 46 is extremely large in the device of FIG. 4 because the porous layer 41 has an extremely large surface area. Naturally, the oxidation-reduction reaction proceeds very rapidly, leading to a rapid response to the display device. It is convenient to determine the response time of an electrochromic display device in terms of, for example, the time required for the coloring of the electrochromic material to reach a predetermined optical density. The display device as shown in FIG. 4 permits about 20% of reduction in the above-noted response time, compared with a conventional display device in which a dense tungsten oxide layer is formed on the conductive electrode.

An additional feature to be noted with respect to the device of FIG. 4 is that the conductive layer 42 is formed of tungsten. It follows that the conductive layer 42 is not corroded by the electrolyte 46 permeating through the porous layer 41 to contact the layer 42. Further, the bonding strength between the conductive layer 42 and the porous layer 41 is sufficiently high. It is also important to note that the display device of FIG. 4 permits a lead wire to be bonded directly to the conductive layer 42 formed of tungsten without other treatment such as a gold plating on the tin oxide layer.

Figure 7:
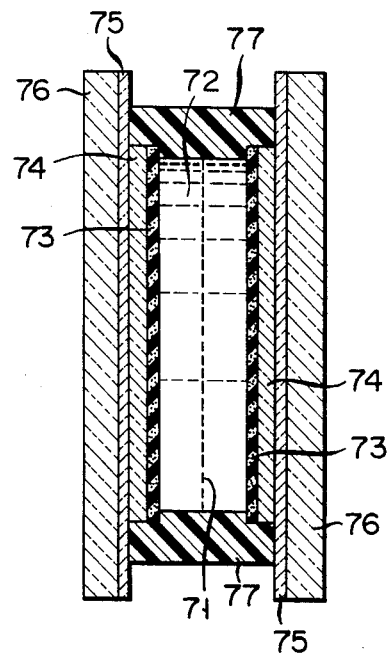
FIG. 7 is a cross sectional view showing a modification of the electrochromic display device of this invention.

Incidentally, U.S. Pat. No. 3,879,108 discloses an electrochromic display device in which an electrochromic material layer is formed on the surface of a counter electrode, as well. The technical idea of the present invention can also be applied to a display device of such a construction. FIG. 7 shows an example of the device of this construction. Briefly speaking, the device of FIG. 7 comprises a pair of laminates each consisting of a transparent conductive film, a protective layer formed on the transparent conductive film, and a porous electrochromic layer formed on the protective layer. To be more specific, reference numeral 71 denotes a electrolyte-permeable or perforated reflective sheet made of tetrafluoroethylene. As shown in the drawing, the reflective sheet 71 is provided in the center of an electrolyte region 72. Incidentally, the electrolyte is capable of passing through the perforations of the reflective plate 71.

The laminate mentioned above is mounted on either side of the reflective sheet 71 in a manner to sandwich the electrolyte 72. Specifically, reference numerals 73, 74 and 75 denote, respectively, a porous layer of tungsten oxide, a dense layer of tungsten oxide and a transparent conductive film. The conductive film 75 acts as a conductive electrode or counter electrode. It is seen that the conductive film 75 is formed on a transparent substrate 76 and the electrolyte 72 is sealed by a sealing material 77.

That part of conductive electrode which is exposed to the electrolyte may be coated with a transparent insulation layer such as an $SiO_2$ layer.

In a conventional electrochromic display device of a symmetrical construction, a pair of laminates each consisting of an electrode and an electrochromic material layer are mounted to face each other with an electrolyte disposed therebetween. Compared with a conventional device of this type, the display device of the this invention as shown in FIG. 7 exhibits an excellent chemical stability, i.e., a long life, and is capable of performing a rapid response.

What we claim is:

1. An electrochromic display device comprising:
   a substrate;
   a conductive electrode formed onto said substrate;
   a protective layer formed onto said conductive electrode, said protective layer for preventing said conductive electrode from being corroded by an electrolyte;
   a porous layer of an electrochromic material formed on said protective layer;
   a counter electrode formed apart from said porous layer; and
   an electrolyte disposed between said porous layer and said counter electrode.

2. An electrochromic display device according to claim 1, wherein said protective layer is a dense layer of an electrochromic material.

3. An electrochromic display device according to claim 1, wherein said porous layer is prepared by forming first a film of a metal providing a metal oxide acting as an electrochromic material, followed by subjecting the metal film to anodic oxidiation.

4. An electrochromic display device according to claim 1, wherein said porous layer is prepared by vapor deposition of an electrochromic metal oxide on said protective layer under a vacuum of $10^{-3}$ to 10 Torr.

5. An electrochromic display device according to claim 1, further comprising a reflective sheet capable of passing said electrolyte and disposed within said electrolyte.

6. An electrochromic display device according to claim 1, wherein said conductive electrode is transparent.

7. An electrochromic display device according to claim 1, wherein said counter electrode comprises a conductive layer, a protective layer formed on said conductive layer and a porous layer of electrochromic material contacting said electrolyte.

8. An electrochromic display device according to claim 1, wherein said electrochromic material is selected from the group consisting of tungsten oxide, molybdenum oxide, titanium oxide and lead oxide.

9. An electrochromic display device, comprising:
   a conductive electrode formed of a metal non-reactive with an electrolyte;
   a porous layer of an electrochromic material formed on said conductive electrode;
   a counter electrode formed apart from said porous layer; and an electrolyte disposed between said porous layer and said counter electrode.

10. An electrochromic display device according to claim 9, wherein said conductive electrode is formed of a material selected from the group consisting of gold, platinum, silver and tantalum.

11. An electrochromic display device according to claim 9, wherein said conductive electrode is formed of a metal providing an electrochromic metal oxide.

12. An electrochromic display device according to claim 10, wherein said porous layer is prepared by forming first a film of a metal providing an electrochromic metal oxide on said conductive electrode, followed by subjecting said metal film to anodic oxidation.

13. An electrochromic display comprising:
a conductive electrode formed from a metal providing an electrochromic metal oxide;
a porous layer of an electrochromic material formed on said conductive electrode;
a counter electrode formed apart from said porous layer; and
an electrolyte disposed between said porous layer and said counter electrode.

14. An electrochromic display device according to claim 13, wherein said porous layer is prepared by subjecting the surface region of said conductive electrode to anodic oxidation.

15. An electrochromic display device according to claim 13, wherein said conductive electrode is of a plate shape.

16. An electrochromic display device according to claim 13, wherein said conductive electrode is formed on a substrate.

17. An electrochromic display device according to claim 13, wherein said electrochromic material is selected from the group consisting of tungsten oxide, molybdenum oxide, titanium oxide and lead oxide.

18. An electrochromic display device according to claim 13, wherein a reflective sheet capable of passing the electrolyte is disposed within said electrolyte.

19. An electrochromic display device comprising:
a conductive electrode formed from a material selected from the group consisting of gold, platinum, silver and tantlum;
a porous layer of an electrochromic material formed on said conductive electrode, said porous layer including the product prepared by forming a film of a metal providing an electrochromic metal oxide on said conductive electrode and thereafter subjecting said metal film to anodic oxidation;
a counter electrode formed apart from said porous layer; and
an electrolyte disposed between said porous layer and said counter electrode.

* * * * *